United States Patent [19]
Ono et al.

[11] Patent Number: 5,900,079
[45] Date of Patent: May 4, 1999

[54] METHOD FOR PRODUCING A STEEL PIPE USING A HIGH DENSITY ENERGY BEAM

[75] Inventors: Moriaki Ono; Tsuyoshi Shiozaki, both of Tokyo, Japan

[73] Assignee: NKK Corporation, Tokyo, Japan

[21] Appl. No.: 08/637,452

[22] Filed: Apr. 25, 1996

[30] Foreign Application Priority Data

Apr. 28, 1995 [JP] Japan .................................. 7-104976

[51] Int. Cl.$^6$ .................................. B23K 26/00
[52] U.S. Cl. .................... 148/519; 148/520; 148/524; 148/525; 219/121.64
[58] Field of Search .................... 148/519, 520, 148/521, 524, 525; 219/121.63, 121.64

[56] References Cited

U.S. PATENT DOCUMENTS

| | | |
|---|---|---|
| 3,585,337 | 6/1971 | Rudd . |
| 4,649,256 | 3/1987 | Minamida et al. . |
| 5,059,759 | 10/1991 | Kudo et al. .................... 219/121.63 |
| 5,379,693 | 1/1995 | Hoffmann et al. .................. 219/121.64 |
| 5,653,899 | 8/1997 | Odake et al. ...................... 219/121.64 |

FOREIGN PATENT DOCUMENTS

| | | |
|---|---|---|
| 0 245 145 | 11/1987 | European Pat. Off. . |
| 0 306 036 | 3/1989 | European Pat. Off. . |
| 2 575 686 | 7/1986 | France . |
| 3-291176 | 3/1991 | Japan . |
| 4-18954 | 3/1992 | Japan . |
| 6-116645 | 4/1994 | Japan ..................................... 148/521 |

OTHER PUBLICATIONS

Y. Inaba et al, "The Present Status and Applications of Laser Processing: A Hybrid Manufacturing Process for Laser Welding of Stainless Steel Pipes", vol. 7, No. 6, Jan. 1, 1993, pp. 487–492.
Patent Abstracts of Japan, vol. 016, No. 129 (M–1228), Apr. 2, 1992 of JP–A–03–291176 (Sumitomo Metal Ind. Ltd.), Dec. 20, 1991.
Patent Abstracts of Japan, vol. 00.8, No. 216 (M–329), Oct. 3, 1984 of JP–A–59–101293 (Sumitomo Kinzoku Kogyo KK), Jun. 11, 1984.
Patent Abstracts of Japan, vol. 007, No. 092 (M–208), Apr. 12, 1983 of JP–A–58–016781 (Sumitomo Kinzoku Kogyo KK), Jan. 31, 1983.

*Primary Examiner*—George Wyszomierski
*Attorney, Agent, or Firm*—Frishauf, Holtz, Goodman, Langer & Chick, P.C.

[57] ABSTRACT

A method of producing a welded steel pipe which comprises: (a) forming a steel strip having two edges in a cylindrical form so that the two edges face each other; (b) preheating the two edges of the steel strip to a temperature of a melting point or less by applying a high frequency electric current to the two edges; (c) pressing the two edges of the steel strip towards each other by contact with squeeze rolls to form a joint portion including a joint line; (d) radiating a high density energy beam sufficient to fuse a full thickness of the steel strip to a portion adjacent to a squeeze point to weld the joint portion; and (e) controlling an upset by applying the squeeze rolls sufficiently to reduce weld defects.

5 Claims, 5 Drawing Sheets

METHOD FOR PRODUCING A STEEL PIPE USING A HIGH DENSITY ENERGY BEAM

BACKGROUND OF THE INVENTION

1. Field of the Invention

The present invention relates to a method for producing an electric-resistance-welded steel pipe, and more particularly to a method for producing an electric-resistance-welded steel pipe using a high density energy beam.

2. Description of the Related Arts

In conventional methods, a steel strip is formed into a cylindrical shape while transferring the steel strip so that both edges of the steel strip face each other. The both edges of the steel strip are welded to produce a steel pipe. Among the conventional methods, an electric-resistance-welding method is the most efficient. In the electric-resistance-welding method, a butt joint portion is heated and fused to form a fusion zone by using induction heating of high frequency electric current or applying a high frequency electric current to the butt joint portion from a contact chip. The fusion zone is pressed by squeeze rolls to remove impurities and oxides which exist in the fusion zone, thus the welding being done. However, oxides having high melting point are not removed and remain in a weld zone by oxygen in air during the heating and the fusion of the edges of the steel strip. The oxides comprise alloying elements such as Mn, Si, and Cr. The remained oxides may result in a weld defect called the "penetrator". To suppress oxidization and to obtain a high quality welded steel pipe, gas shielding is applied. The gas shielding, however, gives not sufficient effect.

A pipe-producing method using a high density energy beam such as laser beam has been developed on the background described above. The method is a welding method to fuse the edges of a steel strip under irradiation of high density energy beam. It is known that since the method avoids exposing the fused metal to atmospheric air, weld defects such as oxide inclusion are hard to generate, and high quality welded steel pipe is obtained.

Figure 4:
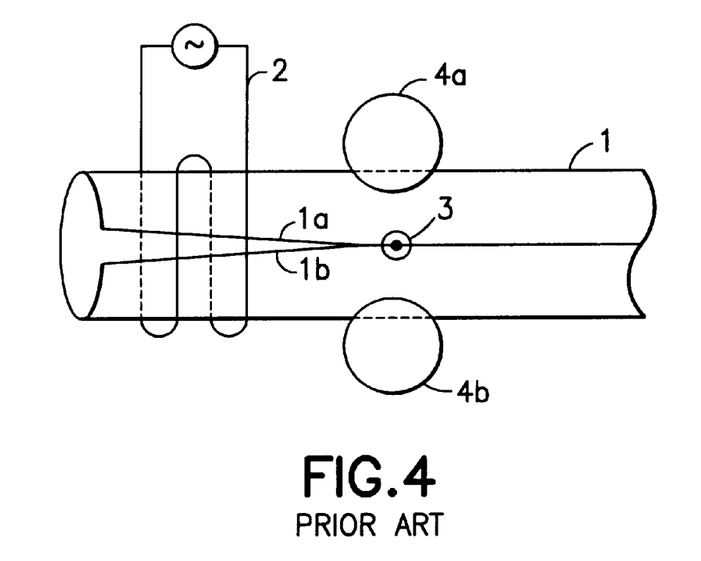
FIG. 4 is a schematic view of a prior art.

The method using high density energy beam is disclosed in JP-A-3-291176 which is published on Dec. 20, 1991 and JP-B-4-18954 which is published Mar. 30, 1992 (the terms "JP-A-" and "JP-B" referred to herein signify "unexamined Japanese patent publication" and "examined Japanese patent publication", respectively). FIG. 4 shows a pipe-producing method disclosed in JP-A-3-291176. A steel strip 1 is formed into an open pipe having edges 1a and 1b. The edges 1a and 1b are heated to a temperature of from 200 to 600° C. using a heat source 2 of a high frequency induction method or a high frequency resistance method. Then a high density energy beam as the second heat source 3 is radiated to a portion 1c adjacent to squeeze rolls 4a and 4b to weld the portion. The method is a complex welding method which increases the welding speed by preheating the steel strip edges using the first heat source to make up the insufficient energy of the second heat source.

The above-mentioned method aims to produce ferritic or austenitic stainless steel pipe. But secondary operation properties such as cutting, bending, press forming and forging deteriorate owing to coarsening of crystal grains in the ferritic stainless steel. The quality of the steel pipe deteriorates owing to weld decay in the austenitic stainless steel. For the above-mentioned problems, the preheating by the high frequency heat source 2 is limited to a temperature of from 200 to 600° C. If, however, a size of steel pipe or a wall thickness of steel pipe increases, the increase of the welding speed cannot be expected by the preheating of a temperature of around 600° C.

Figure 5:
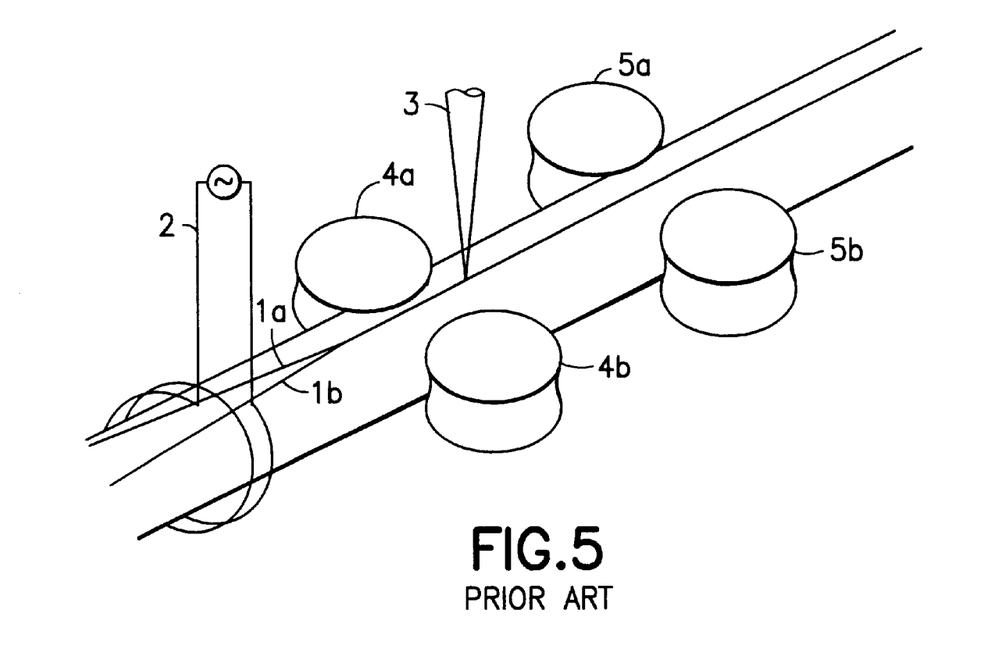
FIG. 5 is another schematic view of another prior art.

FIG. 5 shows a pipe-producing method disclosed in JP-B4-18954. According to the pipe-producing method, preheating is carried out by using the induction heating coil 2 as the first heat source. Upstream of a V-converging point 1d where both edges 1a and 1b of the steel strip firstly contact each other is preheated to a degree that very little fusion occurs at the edges 1a and 1b of the steel strip. The joint face 1c of the steel strip at downstream of the V-converging point 1d is welded by radiating a high density energy beam 3 as a second heat source. In a portion between the V-converging point 1d and the fusion zone by the high density energy beam, and in a portion downstream of the fusion zone, a clamping force is applied to both edges of the steel strip to a degree that both edges simply touch each other.

In this method, the place of irradiation of high density energy beam 3 is carried out at downstream of the V-converging point 1d where both edges of the steel strip contact each other for the first time. As shown in FIG. 5, however, the joint portion may open owing to spring back at downstream of the squeeze rolls 4a and 4b to induce undercut at the weld zone, or solidification cracks may generate depending on the composition of the material. The squeeze rolls 4a, 4b and the squeeze rolls 5a, 5b clamp both edges of the steel strip to a degree that both edges are simply touch each other. Such clamp of both edges, however, has been hard to technologically attain, since there appears a gap between the squeeze rolls 4a and 4b and the squeeze rolls 5a and 5b caused by spring back.

SUMMARY OF THE INVENTION

It is an object of the present invention to provide a method for producing welded steel pipe of high quality with high efficiency and without weld defects.

To attain the object, the present invention provides a method for producing welded steel pipe comprising the steps of:

(a) forming a steel strip having two edges into a cylindrical form so that the two edges face each other;

(b) preheating the two edges of the steel strip to a temperature of a melting point or less by applying a high frequency electric current to the two edges;

(c) pressing the two edges of the steel strip each other by using squeeze rolls to form a joint portion including a joint line;

(d) radiating a high density energy beam sufficient to fuse a full thickness of the steel strip at a portion adjacent to a squeeze point to weld the joint portion, the squeeze point being a crossing point of a hypothetical line extending across centers of squeeze roll shafts and the joint line;

(e) controlling a upset using the squeeze rolls enough to reduce a weld defect simultaneously with the step(d), the upset being a difference between a coil width (mm) before pipe forming and a circumferencial length of pipe (mm).

In the step (d), the high density energy beam can be radiated on the joint line at an upstream side of the squeeze point by 0 to 5 mm.

In the step (e), the upset is preferably from 0.1 to 1 mm.

Furthermore, the present invention provides a method for producing welded steel pipe comprising the steps of:

(a) forming a steel strip into an open pipe having two edges;

(b) joining the two edges of the open pipe to form a joint portion; and (c) radiating a high density energy beam to the joint portion to weld the joint portion, the high density energy beam having a beam axis and an irradiation point, the beam axis being inclined toward a welded portion.

The high density energy beam has an inclination of 5 to 20 degrees. The inclination is an angle formed by the beam axis and a vertical line at the irradiation point.

DESCRIPTION OF THE EMBODIMENT

EMBODIMENT-1

In the embodiment-1, a steel strip having two edges is formed into a cylindrical form so that the two edges face each other. The two edges of the steel strip are preheated to a temperature of a melting point or less by applying a high frequency electric current to the two edges. The preheated two edges are pressed each other by using squeeze rolls to form a joint portion including a joint line. A high density energy beam sufficient to fuse a full thickness of the steel strip is radiated to a portion adjacent to a squeeze point to weld the the joint portion. The squeeze point is a crossing point of a hypothetical line extending across centers of squeeze roll shafts and the joint line. An upset is controlled by using the squeeze rolls to reduce a weld defect. The upset is a difference between a coil width (mm) before pipe forming and a circumferential length of pipe (mm).

The preheating temperature of the edges of the steel strip is preferably from 600 to 1200° C. The joint portion has "I" shape and the gap of joint is preferably 0 to 0.20 mm. The high density energy beam can be radiated on the joint line at an upstream side of the squeeze point by 0 to 5 mm. The joint portion of the edges of steel strip is welded by a laser and the upset given by the squeeze rolls is preferably 0.1 to 1 mm. The preheating zone and the adjacent portion of radiation of the high density energy beam are shielded by a gas.

According to the embodiment-1, a steel strip which is continuously supplied is formed into a cylindrical shape. Both edges of the steel strip are preheated to the melting point of the material or less, preferably to a temperature ranging from 600 to 1200° C., using a high frequency induction method or a high frequency resistance method. A high density energy beam sufficient to fuse a full thickness of the steel strip is irradiated to a portion adjacent to a squeeze point to weld the the joint portion. The high density energy beam can be radiated on the joint line at an upstream side of the squeeze point by 0 to 5 mm. An upset is controlled by using the squeeze rolls simultaneously with radiated the high density energy beam. A preferable upset is from 0.1 to 1.0 mm.

The above described method provides the following advantages.

A maximum welding velocity for full penetration increases and the range of allowable welding speed is widened. A high quality welded steel pipe is produced without generating weld defects such as undercut, blowhole and longitudinal crack.

Detection of a welding position is carried out by a CCD camera which is placed just before the location where the both edges of the steel strip converse each other. The position of the joint portion of the both edges is taken of by the CCD camera and a welding torch is moved, synchronized with movement of the joint line. Thereafter, an excess portion of the weld zone is cut off. Subsequently, a portion adjacent to the weld zone is subjected to a quenching treatment by heating to a predetermined temperature using a high frequency induction power source and water-cooling. After the quenching treatment, tempering is perfomed by heating to a predetermined temperature. Alternatively, the portion adjacent to the weld zone is heated to a predetermined temperature and is air-cooled.

Now preferable individual constitutions of the present embodiment will be described.

(1) Preheat temperature at the edges of steel strip

Figure 2:
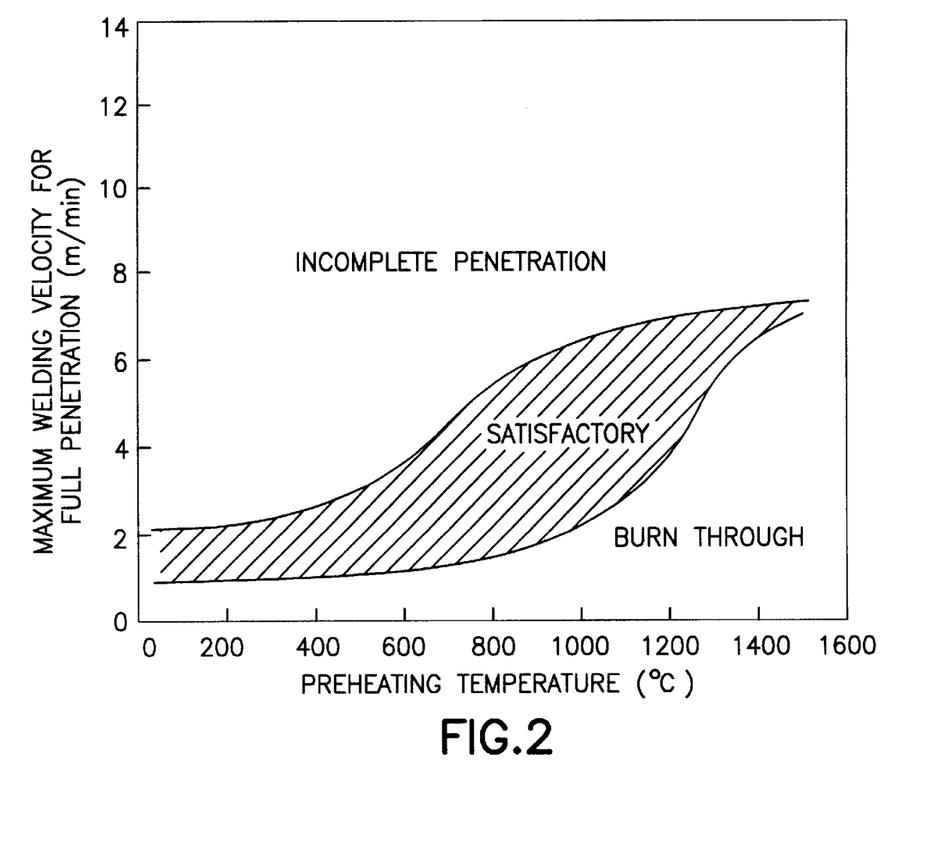
FIG. 2 is a graph showing a relation of preheating temperature, maximum welding velocity for fill penetration, and quality of weld zone according to the embodiment-1.

An effect of the preheating temperature on the welding temperature was investigated. The preheating temperature was changed from room temperature to the melting point of the steel strip. Welding was conducted using a carbon dioxide gas laser with 20 kW of output. The maximum welding velocity for full penetration and the quality of weld zone were studied. FIG. 2 shows the results of the case that a electric-resistance-welded steel pipe was produced by using an ordinary pipe-forming mill in which the steel strip is continuously supplied and cylindrically formed. The electric-resistance-welded steel pipe comprises carbon steel and has a size of 508 mm of outer diameter and 12.7 mm of wall thickness. The hatched area in FIG. 2 indicates the area to provide a satisfactory welding bead.

As seen in FIG. 2, the maximum welding speed increases with the preheating. It is well possible to weld in the preheating temperature of less than 600° C. The preheating temperature of less than 600° C., however, deteriorates productivity because an increase rate of welding speed becomes 1.5 or less. The increase rate of welding speed is defined by the ratio of the maximum welding speed at that temperature when the operation is presently performed to that at the room temperature.

Accordingly, to obtain the increase rate of 1.5 or more, the preheating temperature is preferably 600° C. or more.

When the preheating temperature is over the melting point, the increase rate of welding speed is about 3.5, but a burn through bead appears which invites failure in obtaining a satisfactory welding bead.

When the preheating temperature is over 1200° C. and below the melting point, the increase rate of welding speed is 3 or more. An improvement of productivity is obtained. In that range of temperature, however, the allowable range Δor ΔV ( which is an adequate welding speed range to give a satisfactory welding bead) between the maximum welding speed resulting in a melt down bead and the maximum welding speed for full penetration significantly narrows compared with the case of preheat temperature of 1200° C. or less.

Therefore, the preheating temperature is the melting point of the material or less, preferably from 600 to 1200° C.

(2) Place of radiation of high density energy beam

Both edges of the steel strip formed into cylindrical shape opens owing to spring back at downstream of the crossing point of the hypothetical line extending across centers of squeeze roll shafts and the butt joint line. The crossing point is hereinafter referred to simply as "squeezing point". Accordingly, when welding is conducted under radiation of a high density energy beam to a place downstream of the squeezing point, a tensile stress occurs during the solidification of fused metal to induce weld defects such as undercut and solidification cracks depending on the chemical composition of the material. On the other hand, upstream of the squeezing point, both edges of the cylindrical steel strip come close to each other when they approach the squeezing point, so the weld defects such as solidification cracks which occur downstream of the squeezing point are avoided.

Consequently, it is important to carry out welding by radiating a high density energy beam to a portion adjacent to the squeezing point. Downstream of the squeezing point is, however, not preferable for the portion of radiation of the high density energy beam, where tensile stress is applied to the weld portion, and upstream of the squeezing point is preferable. Even upstream of the squeezing point, a joint gap of above 0.20 mm induces undercut defect owing to the excessive gap. The joint gap of 0.20 mm corresponds to the point of about 5 mm upstream from the squeezing point.

Conclusively, the high density energy beam is radiated to an adjacent area of the squeezing point, and more preferably to a place by 0 to 0.5 mm upstream of the squeezing point. The place of irradiation corresponds to the point giving a joint gap of 0 to 0.20 mm.

(3) Upset

In a pipe-producing welding method which uses a high density energy beam, a fused metal having a narrow width is produced at a high speed, so the solidification rapidly occurs, undercut occurs on the bead portion at rear side and solidification cracks likely occur depending on chemical composition of the material. Furthermore, gas and metallic vapor are likely to be entrapped to generate blow holes. Application of upsetting using squeeze rolls is a means for preventing those type of defects. That is, undercut is prevented by a push-out of fused weld metal toward the plate thickness direction by upsetting. Upsetting pushes out the welding metal, and the push-out action collapses blow holes. On the other hand, solidification cracks of welding metal is prevented by applying compression force to the weld metal by upsetting.

Figure 3:
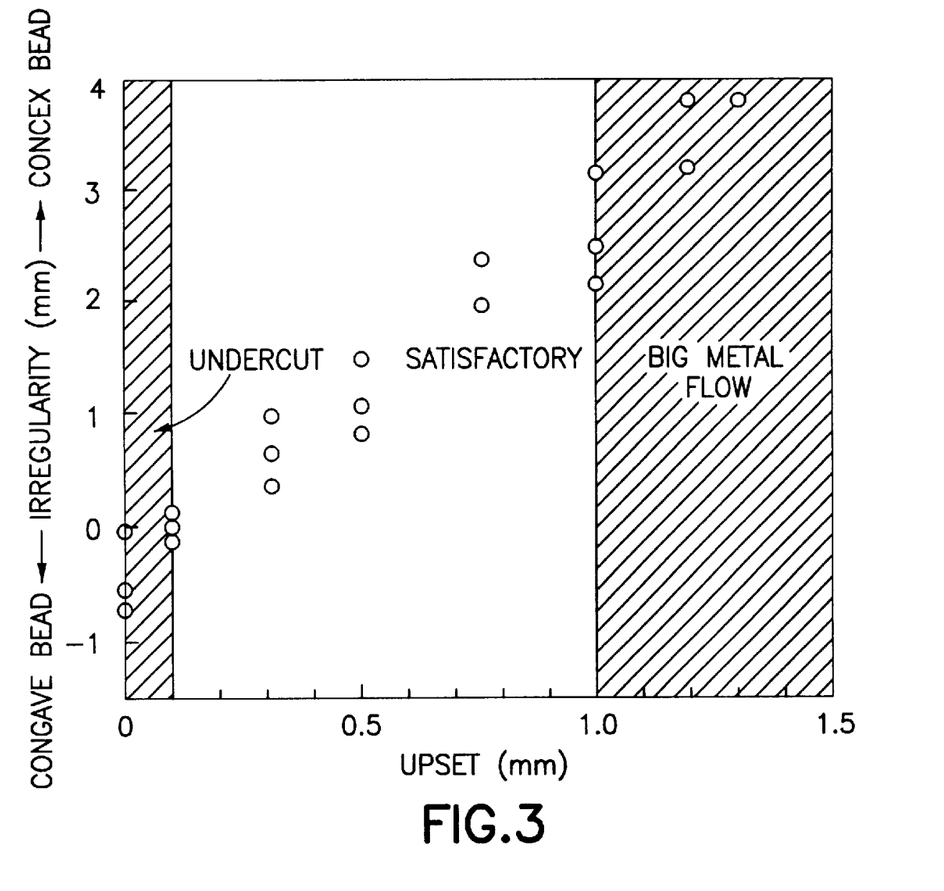
FIG. 3 is a graph showing a relation of upset and quality of weld zone according to the embodiment-1.

The preventive effect against the generation of weld defects using upsetting was experimentally confirmed. Steel pipes were produced by continuously forming a steel strip, electric-resistance-welding and using carbon dioxide gas laser with 20 kW of output. The steel pipes comprise carbon steel and have the size of 508 mm of outer diameter and 7.5 mm of wall thickness using a carbon dioxide gas laser with 20 kW of output. FIG. 3 shows the result of a test in which squeeze rolls clamped the external periphery of welding steel pipe to give a compressive deflection to the weld metal portion to a range of from 0 to 2.0 mm. When the upset is less than 0.1 mm, the push-out of weld metal and the compression force are too small, so the preventive effect against weld defects is small to result in the generation of undercut and weld defects remain. When the upset exceeds 1.0 mm, then the width of weld metal is narrow to a range of from 0.5 to 2 mm, and most of the weld metal is pushed out, and the heat-affecting zone swells by metal flow. Hook cracks which are generated are attributable to the inclusion and to segregation of components after the swollen portion including a bead was machined.

Therefore, upsetting of fused metal is essential for welding by a high density energy beam, more preferably the upset length should be set in a range of from 0.1 to 1.0 mm.

(4) Shield gas

During the pipe-producing process, the preheating zone at the edges of the steel pipe using high frequency current, the weld zone, and the adjacent portion to the weld zone is preferably shielded by inert gas such as helium. The role of shielding is to suppress the remainder of oxide film and oxide generated during the preheating on the butt face of steel strip in the weld zone.

EXAMPLE

Figure 1:
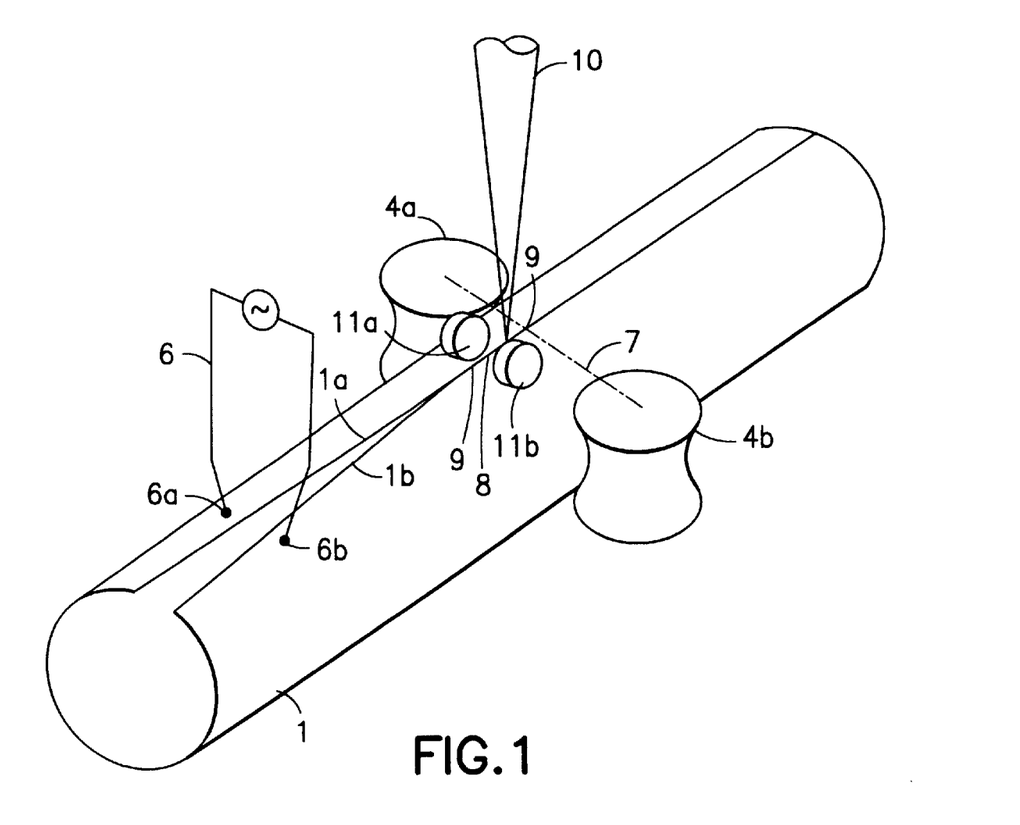
FIG. 1 is a schematic view of an apparatus which is used in the embodiment-1.

FIG. 1 shows a schematic view of an apparatus for producing an electric-resistance-welded steel pipe which is used in the embodiment-1.

According to the example, a steel strip 1 is continuously supplied and formed into a cylindrical shape. Both edges 1a and 1b of the steel strip facing each other were preheated to a temperature of the melting point of the material or less by using a high frequency resistance heating device 6. The contacts 6a and 6b of the high frequency resistance heating device 6 are arranged upstream of the V-converging point 1d with a specified spacing. At an adjacent portion of the squeezing point 9, which is a crossing point of the hypothetical line 7 extending across the centers of squeeze roll shafts 4a and 4b and a butt joint line 8 between the edges 1a and 1b of the steel strip, a high energy density laser beam 10 is radiated to fuse the full thickness of the steel strip 1 to weld a butt joint portion 1c, and simultaneously, the butt joint portion is pressed to a specified upset to join together. The reference numbers 11a and 11b are top rolls which are installed to suppress the misalignment of butt joint portion 1c, at need.

The following are the results of production of electric-resistance-welded steel pipes comprising carbon steel and having the size of 304 to 508 mm of outer diameter and 5.0 to 12.7 mm of wall thickness using the above-described manufacturing equipment The chemical composition of starting material was 0.05 wt. % C, 0.15 wt. % Si, 1.20 wt. % Mn, 0.010 wt. % P, 0.001 wt. % S, 0.05 wt. % Nb, and 0.03 wt. % V.

A carbon dioxide gas laser with 20 kW of maximum output was used. Regarding the producing condition, the shield gas was He or $N_2$ applied to the preheating area on edges of the steel strip and to the adjacent portion of the weld zone. Welded steel pipe was prepared by changing welding speed, preheating temperature, gap of butt joint, place of laser radiation, and upset. When the weld zone swollen by upsetting, a cutter or the like was applied to remove the build up.

The expression of the place of laser irradiation was "−" for upstream of the squeezing point and "+" for downstream thereof.

The quality of the thus prepared welded steel pipe was evaluated by the criteria given below.

As for the bead shape, appearance inspection was given to observe the bead penetration across the full thickness, the undercut on the bead surface, the presence of burn through, and the generation of hook cracks after bead machined.

For the weld defects inside of the weld zone, nondestructive inspection was applied to check the number of blow holes and inclusions and the presence of solidification cracks.

The impact property of the weld zone of the steel pipe produced by the present invention was evaluated by the fracture appearance transition temperature vTs (the temperature that the ductile fracture percentage becomes 50%) which was determined by Charpy the impact test.

These evaluation tests were applied to the weld zone which was treated by quenching and tempering ( heating to 950° C.→water quenching→tempering at 600° C.).

Table 1 and Table 2 show the manufacturing conditions and the quality evaluation of Examples and Comparative Examples.

TABLE 1

| | | Manufacturing conditions | | | | | | | | | Quality of welded portion | |
|---|---|---|---|---|---|---|---|---|---|---|---|---|
| | | Pipe dimensions | | | | | | Place of | | | Number of | |
| No. | | Diameter (mm) | Wall thickness (mm) | Laser output (kw) | Welding velocity (m/sec) | Shield gas | Preheat temperature (° C.) | Butt-gap | laser irradiation (mm) | Upset length (mm) | Bend shape | generated weld defects (piece/m) | vTs(° C.) |
| This | 1 | 508 | 12.7 | 20 | 2.2 | He | 300 | 0.04 | −2.0 | 0.20 | Good | 0 | −85 |
| inven- | 2 | 508 | 12.7 | 20 | 28 | He | 500 | 0.03 | −2.2 | 0.32 | Good | 0 | −90 |
| tion | 3 | 508 | 12.7 | 20 | 3.0 | N2 | 800 | 0.06 | −2.6 | 0.54 | Good | 0 | −80 |
| | 4 | 508 | 12.7 | 20 | 5.0 | N2 | 800 | 0.05 | −2.5 | 0.75 | Good | 0 | −75 |
| | 5 | 508 | 12.7 | | 2.5 | He | 1000 | 0.05 | −2.5 | 0.54 | Good | 0 | −85 |
| | 6 | 508 | 12.7 | 20 | 6.5 | He | 1000 | 0.05 | −2.5 | 0.88 | Good | 0 | −90 |
| | 7 | 508 | 12.7 | 20 | 4.0 | N2 | 1200 | 0.06 | −2.6 | 0.32 | Good | 0 | −90 |
| | 8 | 508 | 12.7 | 20 | 7.0 | He | 1200 | 0.05 | −2.5 | 0.44 | Good | 0 | −80 |
| | 9 | 508 | 12.7 | 20 | 6.0 | He | 1300 | 0.04 | −0.5 | 0.28 | Good | 0 | −95 |
| | 10 | 508 | 12.7 | 20 | 7.0 | He | 1300 | 0.07 | −2.7 | 0.52 | Good | 0 | −85 |
| | 11 | 508 | 12.7 | 20 | 7.0 | N2 | 1400 | 0.06 | −1.8 | 0.38 | Good | 0 | −90 |
| | 12 | 406 | 12.7 | 20 | 4.0 | N2 | 800 | 0.04 | −2.0 | 0.10 | Good | 0 | −75 |
| | 13 | 406 | 12.7 | 20 | 4.0 | He | 800 | 0.04 | −2.0 | 0.50 | Good | 0 | −90 |
| | 14 | 406 | 12.7 | 20 | 4.0 | He | 800 | 0.04 | −2.0 | 1.00 | Good | 0 | −90 |
| | 15 | 304 | 5.0 | 20 | 12.0 | N2 | 1000 | 0.20 | −5.0 | 0.25 | Good | 0 | −90 |
| | 16 | 304 | 5.0 | 20 | 12.0 | N2 | 1000 | 0.05 | −2.5 | 0.60 | Good | 0 | −85 |
| | 17 | 304 | 5.0 | 20 | 12.0 | He | 1000 | 0.01 | −0.0 | 0.45 | Good | 0 | −85 |
| | 18 | 508 | 12.7 | 20 | 4.0 | N2 | 1200 | 0.03 | −1.8 | 0.95 | Good | 0 | −80 |
| | 19 | 508 | 12.7 | 20 | 5.0 | N2 | 1200 | 0.04 | −1.9 | 0.38 | Good | 0 | −90 |
| | 20 | 508 | 12.7 | 20 | 6.0 | He | 1200 | 0.03 | −1.8 | 0.40 | Good | 0 | −85 |
| | 21 | 508 | 12.7 | 20 | 6.0 | He | 1300 | 0.04 | −2.0 | 0.26 | Good | 0 | −80 |

TABLE 2

| | | Manufacturing conditions | | | | | | | | | Quality of welded portion | |
|---|---|---|---|---|---|---|---|---|---|---|---|---|
| | | Pipe dimensions | | | | | | Place of | | | Number of | |
| No. | | Diameter (mm) | Wall thickness (mm) | Laser output (kw) | Welding velocity (m/sec) | Shield gas | Preheat temperature (° C.) | Butt-gap | laser irradiation (mm) | Upset length (mm) | Bend shape | generated weld defects (piece/m) | vTs(° C.) |
| Com- | 1 | 508 | 12.7 | 20 | 2.0 | He | Room tem. | 0.05 | −2.5 | 0.50 | Good | 0 | −85 |
| parativ | 2 | 508 | 12.7 | 20 | 2.0 | He | 1200 | 0.05 | −2.5 | 0.50 | | 10 | −35 |
| exam- | 3 | 508 | 12.7 | 20 | 3.0 | N2 | 1200 | 0.04 | −2.5 | 0.52 | | 14 | −40 |
| ple | 4 | 508 | 12.7 | 20 | 7.5 | He | 1200 | 0.06 | −2.6 | 0.54 | Not penetrated | 12 | −20 |
| | 5 | 508 | 12.7 | 20 | 4.0 | N2 | 1300 | 0.05 | −2.5 | 0.60 | | 8 | −30 |
| | 6 | 508 | 12.7 | 20 | 4.0 | He | 1300 | 0.05 | −2.5 | 0.54 | | 15 | −40 |
| | 7 | 508 | 12.7 | 20 | 5.5 | N2 | 1300 | 0.05 | −2.5 | 0.68 | | 14 | −35 |
| | 8 | 508 | 12.7 | 20 | 7.5 | N2 | 1300 | 0.06 | −2.6 | 0.32 | Not penetrated | 15 | −25 |
| | 9 | 508 | 12.7 | 20 | 6.5 | N2 | 1400 | 0.03 | −0.5 | 0.18 | | 20 | −30 |
| | 10 | 508 | 12.7 | 20 | 9.0 | He | 1500 | 0.05 | −0.2 | 0.12 | | 25 | −35 |
| | 11 | 406 | 12.7 | 20 | 4.0 | He | 800 | 0.04 | −1.2 | 0.00 | Undercut | 0 | −35 |
| | 12 | 406 | 12.7 | 20 | 4.0 | He | 800 | 0.05 | −1.5 | 0.08 | Undercut | 0 | −25 |
| | 13 | 406 | 12.7 | 20 | 4.0 | He | 800 | 0.06 | −1.6 | 1.52 | Hook crack | 0 | −40 |
| | 14 | 406 | 12.7 | 20 | 4.0 | He | 800 | 0.04 | −1.5 | 2.00 | Hook crack | 0 | −30 |
| | 15 | 406 | 12.7 | 20 | 4.0 | He | 800 | 0.04 | −2.0 | 0.05 | Undercut | 0 | −40 |
| | 16 | 406 | 12.7 | 20 | 4.0 | He | 800 | 0.04 | −1.8 | 1.25 | Hook crack | 0 | −25 |
| | 17 | 304 | 5.0 | 10 | 12.0 | N2 | 1000 | 0.30 | −7.0 | 0.30 | Undercut | 0 | −35 |
| | 18 | 304 | 5.0 | 10 | 12.0 | He | 1000 | 0.05 | +2.5 | 0.35 | Good | Solidification crack | — |
| | 19 | 304 | 5.0 | 10 | 12.0 | N2 | 1000 | 0.15 | +5.0 | 0.55 | Undercut | Solidification crack | — |
| | 20 | 304 | 7.5 | 10 | 5.0 | N2 | 700 | 0.35 | −8.0 | 0.35 | Undercut | 0 | −30 |
| | 21 | 304 | 7.5 | 10 | 5.0 | He | 700 | 0.44 | −10.0 | 0.45 | Undercut | 0 | −35 |
| | 22 | 304 | 7.5 | 10 | 5.0 | He | 700 | 0.07 | +1.5 | 0.40 | Good | Solidificiation crack | — |
| | 23 | 304 | 7.5 | 10 | 5.0 | N2 | 700 | 0.33 | +7.5 | 0.25 | Undercut | Solidification crack | — |

TABLE 2-continued

| | Manufacturing conditions | | | | | | | | | Quality of welded portion | | |
|---|---|---|---|---|---|---|---|---|---|---|---|---|
| | Pipe dimensions | | | | | | Place of | | | Number of | | |
| No. | Diameter (mm) | Wall thickness (mm) | Laser output (kw) | Welding velocity (m/sec) | Shield gas | Preheat temperature (° C.) | Butt-gap | laser irradiation (mm) | Upset length (mm) | Bend shape | generated weld defects (piece/m) | vTs(° C.) |
| 24 | 304 | 5.0 | 10 | 12.0 | N/A | 1000 | 0.20 | −5.0 | 0.25 | Good | 20 | −20 |
| 25 | 304 | 5.0 | 10 | 12.0 | N/A | 1000 | 0.05 | −2.5 | 0.60 | Good | 25 | −20 |

The effect of preheating was investigated in Examples No.1 through No.11 and Comparative Examples No.1 through No.10.

Comparative Example No.1 showed the results of welding without preheating, using 2.0 m/min. of welding speed for full penetration. On the other hand, Examples No.1 through No.6 which were subjected to preheat ranging from 300 to 1000° C. showed an increase of welding speed for full penetration, and that for 600° C. of preheat was approximately 1.5 times the speed at room temperature.

In the case that the preheat was carried out at 1200° C., Comparative Example No.3 which used the welding speed of 3.0 m/min. resulted in a burn through bead, and Comparative Example No.4 which used the welding speed of 7.5 m/min. resulted in an incomplete penetration. Examples No.7 and No.8 which used the welding speed of 4.0 m/min. and 7.0 m/min., respectively, provided a satisfactory bead.

For the case of 1300° C. of preheat, Examples No.9 and No.10 which used the welding speed of 6.0 m/min. and 7.0 m/min., respectively, provided the satisfactory bead. Comparative Examples No.5 through No.7 which used the welding speed of 4.0 m/min. and 5.5 m/min., respectively, resulted in the burn through bead, and Comparative Example No.8 which used the welding speed of 7.5 m/min. resulted in the incomplete penetration.

As described above, the allowable range of welding speed for the satisfactory bead is wide so as to be 3 m/min. for the case of 1200° C. of preheating temperature, and the allowable range significantly narrowed to about 1 m/min. for the case of 1300° C. of preheating temperature.

In the case of 1400° C. of preheating temperature, Comparative Example No.9 which used 6.5 m/min. of welding speed resulted in the burn through bead, as in the case of 1300° C. of preheating temperature. Example No.11 provided the satisfactory bead at 7.0 m/min. of welding speed. Accordingly, the allowable welding speed range to obtain the satisfactory bead further narrowed. In the case that the burn through bead or the incomplete penetration bead are formed, the solidification of fused metal became unstable, and weld defects such as oxide inclusion and blow hole remained in the weld zone, and gave high Charpy transition temperature (vTs) as high as −40° C. or more.

In this manner, the preheat of both edges of the steel strip increased the welding speed for full penetration and improved the productivity compared with the case of the room temperature processing. However, preheating up to the melting point of the material results in the bum through bead, so the preheat temperature is preferably not to exceed the melting point of the material. When the productivity is taken into account, the lower limit of preheat temperature is preferably to set at 600° C. or less. When the allowable welding speed range for the satisfactory bead, the upper limit thereof is preferably to set at 1200° C. or less.

The effect of upsetting was investigated in Examples No.12 through No.14 and Comparative Examples No.11 through No.16.

Comparative Example No.11 did not apply upsetting, and generated solidification cracks in the welded portion. Since the application of upsetting prevented the generation of solidification cracks, upsetting is essential. Comparative Examples No.12 and No.15 which applied upset less than 0.10 mm resulted in an undercut bead because of insufficient upsetting. Comparative Examples No.13, 14, and 16 which applied upset above 1.00 mm generated hook cracks owing to excessive upsetting. On the other hand, Examples No.12, 13, and 14 which applied upset in a range of from 0.10 to 1.00 mm provided satisfactory bead.

Consequently, upsetting is essential to obtain the satisfactory bead, and preferably the upset is preferably from 0.10 to 1.00 mm.

The effect of place of laser irradiation was investigated in Examples No.15 through No.21 and Comparative Examples No.17 through No.23.

Comparative Examples No.18, 19, 22, and 23 which received the radiation of the laser downstream of the squeezing point generated solidification cracks within the bead. When the place of laser radiation was selected upstream of the squeezing point, generation of solidification cracks was avoided. Comparative Examples No.17, 20, and 21 which received the radiation of the laser at more than 5 mm distant from the squeezing point, the gap of the butt joint became excessive and an undercut was generated. On the other hand, when the place of laser irradiation was selected to a range of from 0.0 to 5.0 mm upstream of the squeezing point, a satisfactory bead was obtained.

Accordingly, the place of laser radiation is preferably set to a range of from 0.0 to 5.0 mm upstream from the squeezing point.

The effect of shield gas was investigated in Comparative Examples No.24 and 25.

Comparative Examples No.24 and 25 did not use shield gas. Lots of oxide inclusion and blow holes appeared in the welded portion, and vTs degraded. On the other hand, Examples No.1 through No.21 used shield gas, and provided a satisfactory bead.

Therefore, shield gas is preferably important.

As described above, in Comparative Examples which were processed at outside of the scope of the present embodiment, when the material is preheated to the melting point or more thereof, when upsetting is not applied to the fused metal portion to press it against squeeze rolls, or when no shield gas is used, bead shape is degraded and weld defects are generated. Also vTs became −40° C. or above.

To the contrary, in Examples No.1 through No.21 which used the condition for manufacturing welded steel pipe of the present embodiment, bead shape was satisfactory, weld defect was not generated, and satisfactory vTs value was obtained.

According to the present embodiment, a steel strip which was continuously supplied is formed into cylindrical shape; both edges of the steel strip are preheated to the melting point of the material or less than thereof, preferably to a temperature ranging from 600 to 1200° C., using a high frequency induction method or a high frequency resistance method while radiating a high density energy beam, which beam enables to fuse full thickness of the steel strip, to a place adjacent to the crossing point of a hypothetical line extending across the centers of squeeze roll shafts and the butting line, more preferably at 0 to 5.0 mm upstream of the crossing point, under application of a compression force to a predetermined upset length to conduct welding, simultaneously the squeeze rolls apply compression of preferably 0.1 to 1.0 mm. With the procedure, a high quality welded steel pipe is produced at a high efficiency without having weld defects such as undercut, blowhole, or longitudinal cracks.

EMBODIMENT-2

A method for producing a electric-resistance-welded steel pipe of the present embodiment comprises: forming a steel strip into an open pipe; joining both edges of the steel strip together; radiating high density energy beam to the joint portion with an inclination toward the welded portion along the welding line to weld the joint portion.

Figure 6:
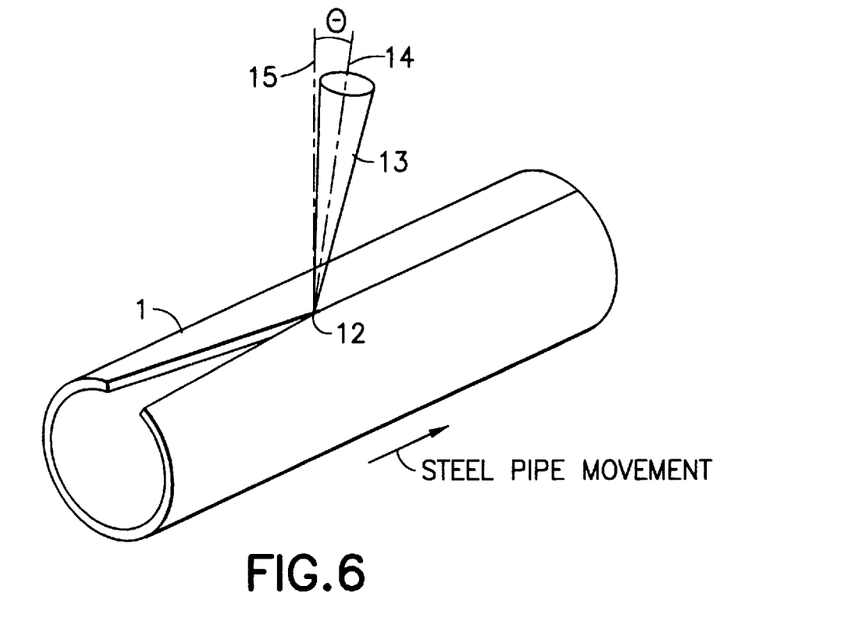
FIG. 6 is a schematic view of the embodiment-2.

The present embodiment applies the inclination, θ, of the high density energy beam in a range of from 5 to 20 degrees. As shown in FIG. 6, the beam inclination, θ, is an angle formed by the beam axis 14 and the normal line 15 to the base pipe at the beam irradiation point.

The present embodiment comprises: forming a steel strip into an open pipe; preheating both edges of the steel strip to a temperature ranging from 300 to 1200° C. using an electric resistance method or an induction heating method; joining the edges each other; and radiating a high density energy beam to the joint portion to weld thereof.

The present embodiment is characterized in that the applied beam of the high density energy radiating to the joint portion of the open pipe is inclined toward the welded portion along the welding line. The reason why the beam inclined toward the welded portion along the welding line suppresses the above-described weld defects is as follows. Generally, a beam which is converged to a point of welding has a small converged diameter ranging from 50 to 500 μm and is radiated normal to the open pipe. Accordingly, the key hole formed during the welding gives a small diameter thereof, and likely collapses due to a gravity sagging of fused metal at a rear side of the fused basin, which tends to generate weld defects such as blow hole.

On the other hand, when the beam is inclined toward the welded portion along the weld line, as in the case of the present embodiment, the key hole area becomes wide owing to the gravity action to the fused metal at the rear side of the fused basin. Consequently, the sagging of fused metal does not fill the key hole, thus the generation of weld defects such as key hole is avoided.

Figure 7:
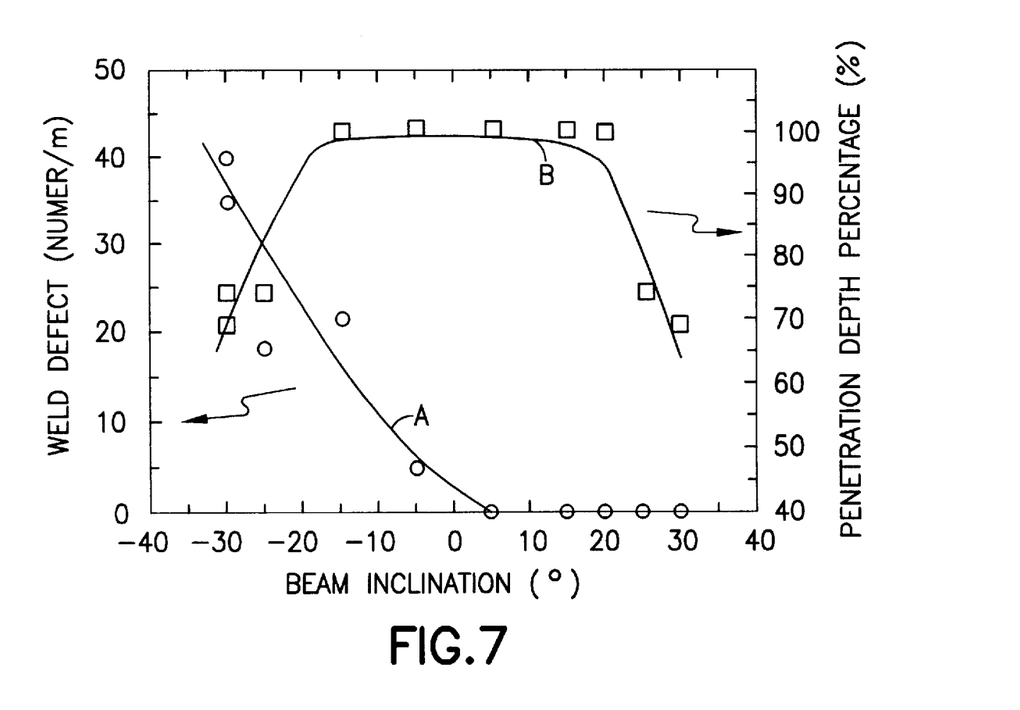
FIG. 7 is a graph showing a relations of a beam inclination to generated weld defects in number and to penetration depth according to the embodiment-2.

The experiment proved that the optimum inclination, θ, of the beam is in a range of from 5 to 20 degrees toward the welded portion along the welding line. The experiment was conducted using a carbon steel strip having 12 mm of thickness, a carbon dioxide gas laser with 20 kW of output, and with varied beam inclinations and welding speeds. The result is shown in FIG. 7. FIG. 7 shows the evaluation of a generated number of weld defects and penetration depth by the expression of relation between the beam inclination and the welding speed. The line "A" shows the relation between the beam inclination and the Generated number of weld defects. The line "B" shows the relation between the beam inclination and the penetration depth.

In FIG. 7, vertical radiation of the beam onto the open pipe is taken as "0°" The beam inclined toward the welded portion is taken as "+", and the beam inclined toward the not yet welded portion is taken as "−". Regarding the number of generated blow holes in relation to the beam inclination, the generation of blow holes was suppressed when the inclination became +5° or more independent of the welding speed. Within a beam inclination range of from −20 to +20°, the penetration depth at the weld bead portion gave about 0.8 times or more to the penetration depth at beam inclination of 0° (or the penetration depth ratio) where the depth reached to maximum level. Thus the beam inclination range of from −20 to +20° does not impair productivity. In the case that the beam inclination is outside of the range of −20 to +20°, however, the ratio of penetration depth became 0.8 or less to degrade the productivity. Therefore, the beam inclination is set to a range of from +5 to +20° toward the welded portion along the welding line.

FIG. 6 is a schematic view of the method of the present embodiment.

As seen in FIG. 6, a steel strip 1 is formed into an open pipe while joining both edges thereof, and a laser beam 13 which was converged by a processing lens (not shown) is radiated onto a joint portion 12 of the steel strip 1 at a beam inclination, θ, toward the welded portion along the welding line to perform the welding of the joint portion 12. The beam inclination, θ, is an angle between the beam axis 14 of the laser beam 13 and the normal line 15 to the open pipe at the beam irradiation point. Only the inclination within a specific range toward the welded portion along the welding line gives a satisfactory result as described below. The experiment proved that the range of inclination, θ, is from 5 to 20°.

The effect of the present invention will be described below referring to the embodiment.

The base material was a hot-rolled steel strips having thickness range of from 4.8 to 16 mm. These steel strips were formed into pipes having a diameter of from 75 to 508 mm. The joint portion of each pipe was welded under radiation of above-described laser beam 13.

The welding wad conducted at the laser beam inclination ranging from −30 to +30° along the welding line. The welding condition was 20 kW of laser output, 40 to 290 mm/sec. of welding speed, and helium as shield gas. The joint portion of the open pipe was heated to 600° C. or 1000° C. by an electric resistance method, and the pipe-welding was performed under the above-described condition.

The welded pipe was obtained under the condition, and the presence of blow holes and the penetration depth at the welded portion were checked.

Table 3 and Table 4 show the pipe size, the welding condition, and the evaluation of the weld bead.

TABLE 3

|  |  | Pipe dimensions | | Welding | | | Number of generated | Penetration |
| --- | --- | --- | --- | --- | --- | --- | --- | --- |
|  | No. | Diameter (mm) | Wall thickness (mm) | Laser output (kW) | velocity v (mm/sec) | Beam inclination (deg) | weld defects (—/m) | depth (%) |
| Comparative | 1 | 75 | 4.8 | 20 | 160 | −30 | 35 | 75 |
| Example | 2 | 75 | 4.8 | 20 | 160 | +30 | 0 | 70 |
|  | 3 | 168 | 7.5 | 20 | 160 | −5 | 5 | 100 |
|  | 4 | 168 | 7.5 | 20 | 160 | +25 | 0 | 75 |
|  | 5 | 168 | 7.5 | 15 | 125 | +30 | 0 | 70 |
|  | 6 | 273 | 12.7 | 20 | 80 | −30 | 40 | 70 |
|  | 7 | 273 | 12.7 | 20 | 80 | −15 | 22 | 100 |
|  | 8 | 273 | 12.7 | 20 | 80 | +25 | 0 | 75 |
|  | 9 | 508 | 16.0 | 20 | 40 | −25 | 19 | 75 |
|  | 10 | 508 | 16.0 | 20 | 40 | +30 | 0 | 70 |
| This | 11 | 75 | 4.8 | 20 | 160 | +20 | 0 | 100 |
| invention | 12 | 75 | 4.8 | 20 | 160 | +5 | 0 | 100 |
|  | 13 | 168 | 7.5 | 20 | 160 | +20 | 0 | 100 |
|  | 14 | 168 | 7.5 | 20 | 125 | +15 | 0 | 100 |
|  | 15 | 168 | 7.5 | 15 | 125 | +5 | 0 | 100 |
|  | 16 | 273 | 12.7 | 20 | 80 | +20 | 0 | 100 |
|  | 17 | 273 | 12.7 | 20 | 80 | +5 | 0 | 100 |
|  | 18 | 273 | 12.7 | 20 | 80 | +15 | 0 | 100 |
|  | 19 | 508 | 16.0 | 20 | 40 | +20 | 0 | 100 |
|  | 20 | 508 | 16.0 | 20 | 40 | +5 | 0 | 100 |

TABLE 4

|  |  | Pipe dimensions | | Preheat | Welding | | | Number of generated | Penetration |
| --- | --- | --- | --- | --- | --- | --- | --- | --- | --- |
|  | No. | Diameter (mm) | Wall thickness (mm) | temperature (° C.) | Laser output (kW) | velocity v (mm/sec) | Beam inclination (deg) | weld defects (—/m) | depth (%) |
| Comparative | 1 | 168 | 7.5 | 600 | 20 | 210 | −5 | 8 | 100 |
| Example | 2 | 168 | 7.5 | 600 | 20 | 210 | +25 | 0 | 75 |
|  | 3 | 168 | 7.5 | 600 | 15 | 160 | +30 | 0 | 70 |
|  | 4 | 168 | 7.5 | 1000 | 20 | 290 | −5 | 7 | 100 |
|  | 5 | 168 | 7.5 | 1000 | 20 | 290 | +25 | 0 | 75 |
|  | 6 | 168 | 7.5 | 1000 | 15 | 225 | +30 | 0 | 70 |
|  | 7 | 508 | 16.0 | 600 | 20 | 55 | −25 | 21 | 75 |
|  | 8 | 508 | 16.0 | 600 | 20 | 55 | +30 | 0 | 70 |
|  | 9 | 508 | 16.0 | 1000 | 20 | 75 | −25 | 19 | 100 |
|  | 10 | 508 | 16.0 | 1000 | 20 | 75 | +30 | 0 | 100 |
| This | 11 | 168 | 7.5 | 600 | 20 | 210 | +20 | 0 | 100 |
| invention | 12 | 168 | 7.5 | 600 | 20 | 160 | +15 | 0 | 100 |
|  | 13 | 168 | 7.5 | 600 | 15 | 160 | +5 | 0 | 100 |
|  | 14 | 168 | 7.5 | 1000 | 20 | 290 | +20 | 0 | 100 |
|  | 15 | 168 | 7.5 | 1000 | 20 | 225 | +15 | 0 | 100 |
|  | 16 | 168 | 7.5 | 1000 | 15 | 225 | +5 | 0 | 100 |
|  | 17 | 508 | 16.0 | 600 | 20 | 55 | +20 | 0 | 100 |
|  | 18 | 508 | 16.0 | 600 | 20 | 55 | +25 | 0 | 100 |
|  | 19 | 508 | 16.0 | 1000 | 20 | 75 | +20 | 0 | 100 |
|  | 20 | 508 | 16.0 | 1000 | 20 | 75 | +5 | 0 | 100 |

The criterion of evaluation for blow hole generation at the welded portion was that 3 or more of blow holes per 1 m of weld length is "bad" and that less than 3 of blow holes is "good". The penetration depth was expressed by the ratio to the strip thickness. The criterion of evaluation of penetration depth was that the full penetration bead is essential, or that the penetration depth ratio of 100 is evaluated as "good" and that the ratio of less than 100 is evaluated as "bad".

In Table 3, Comparative Examples No. 2, 4, 5, 8, and 10 used the beam inclination of +25° or more, and generated no weld defect. These Comparative Examples, however, failed to penetrate the weld bead into the strip thickness, and the penetration depth ratio was less than 100.

Comparative Examples No. 1, 3, 6, 7, and 9 used the beam inclination of −5° or less, and many weld defects occurred.

In Table 4, Comparative Examples No. 2, 3, 5, 6, 8, and 10 used the beam inclination of +25° or more, and generated no weld defect These Comparative Examples, however, did not show full penetration, and the penetration depth ratio was less than 100.

Comparative Examples No. 1, 4, 7, and 9 used the beam inclination of −5° or less, and many weld defects occurred.

As described above, the welding condition that was out of the range of the present embodiment generated weld defects or resulted in an incomplete penetration. On the other hand, only the beam inclination that satisfies the whole range of the present invention provided satisfactory weld beads without generating weld defect.

Consequently, a welding condition outside of the range of the present embodiment degraded bead shape or generated weld defects. To the contrary, it is understood that only the case where the whole welding conditions of the present embodiment are satisfied provides satisfactory bead shape without containing weld defects.

The present embodiment is applicable not only for producing a electric-resistance-welded steel pipe but also for butt welding of general work. The sectional shape of an open pipe is arbitrarily selected, for example, as a circular or rectangular shape.

As described above, the present embodiment conducts welding by radiating high density energy beam inclining to a specified angle toward the welded portion along the weld line. The welding is stably performed in a penetrating welding. Thus the weld defects such as undercut, blow hole, burn through, which have been inherent defects of the laser welding process, are completely prevented. In addition, the welding provides satisfactory bead shape on both the inside and outside of the steel pipe. Furthermore, the method of the present invention further improves the features of high efficiency of laser welding to increase the productivity.

What is claimed is:

1. A method for producing a welded steel pipe comprising the steps of:
   (a) forming a steel strip into an open pipe having two edges;
   (b) joining the two edges of the open pipe to form a joint portion;
   (c) radiating a high density energy beam to the joint portion to weld the joint portion, the high density energy beam having a beam axis and an irradiation point, the beam axis being inclined toward the joint portion, wherein said high density energy beam has an inclination of 5 to 20 degrees and the inclination is an angle between the beam axis and a vertical line at the irradiation point.

2. The method of claim 1, further comprising the step of preheating two edges of the open pipe, the preheated edges being joined in the step (b).

3. The method of claim 2, wherein said preheating is carried out by using an electric resistance heating.

4. The method of claim 2, wherein said preheating is carried out by using an induction heating.

5. The method of claim 3, wherein the preheating is carried out at a temperature of 300 to 1200° C.

* * * * *